United States Patent Office 2,754,291
Patented July 10, 1956

2,754,291
POLYAMINO ACIDS
Maxwell A. Pollack, Morris Plains, N. J.
No Drawing. Application August 9, 1951,
Serial No. 241,165
6 Claims. (Cl. 260—89.7)

This invention relates to new compositions of matter comprising compounds of high molecular weight containing nitrogen, and methods for making them.

Specifically, this invention relates to the products obtained when halogen-containing polymers are treated with certain nitrogenous chemicals. The products are of the type formula

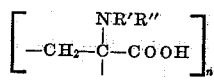

in which R' and R" represent the same or a different component selected from the group consisting of hydrogen, alkyls, hydroxyalkyls and cycloalkyls and $n$ indicates the number of moles of monomer associated in the polymer.

For example, I have found that when poly-alpha-chloroacrylic acid is condensed with certain amines, the chlorine atoms are replaced with amino groups, yielding polyaminoacids of high molecular weight, which have very valuable properties, particularly in the field of protein-like substances. In related manner, as shall be shown herein, it is possible to produce high-molecular weight products with varying proportions of acidic, basic, amido, and hydroxyl groups.

These products show new and improved functions in a variety of fields of application.

On a structural basis, it is known that the water-binding property of high polymers is a direct function of the nature and amount of structural units contained in the molecule. Pure hydrocarbon structures, such as —CH₂— units, have very poor hydrophilic properties and do not bind water to any appreciable extent. On the other hand, free amino and acid units, particularly when coexisting in the same molecule so that true "zwitterions" are formed, have exceedingly strong water-binding and hydrophilic properties. Structures such as ester groups, amide groups, hydroxyl groups, and the like are intermediate in effect.

I have now discovered that when high-molecular weight polymers of haloacrylic acids and derivatives are treated with amino and related compounds, reactions occur to convert the polymers into high-molecular weight compounds containing high percentages of amino and carboxyl groups, and these products show a very high ability to combine with water.

The molecular weights of the final products depend directly upon the molecular weights of the polyhaloacrylates used. Polymeric aminoacids of molecular weights in the range of natural proteins can be obtained by starting with polyhaloacrylates of such molecular weights, for example, 30,000–300,000, etc. Thus, to obtain final products of any desired molecular weights, the polymerization of the haloacrylate is controlled so as to obtain these molecular weights. To obtain low molecular weight products, polymerization should be effected in the presence of one or more of the following factors: high content of catalyst, large amount of solvent, and high temperature. For high molecular weight products, the opposites of these conditions should be employed.

Final products of the desired molecular weights can also be obtained by fractionation procedures. Synthetic high polymers always consist of a range of molecular weights, which can be separated into fractions by application of treatments such as partial precipitation, fractional "salting out" with ammonium sulfate and the like, separation by ultra-centrifugation, electrophoresis and other physical methods, or fractional solution, when the polymer is present in solid form, by careful treatment with water, salt solutions or other selected solvents.

One of the best methods for producing polyaminoacids of the desired hydrophilic and water-binding properties involves condensing a polymer of a haloacrylic acid, such as poly-alpha-chloroacrylic acid, with a dialkyl amine, such as dimethyl amine, or a dialkylolamine, such as diethanolamine. For example, the product obtained after condensation of poly-alpha-chloroacrylic acid and diethanolamine appears to be essentially represented by the structure

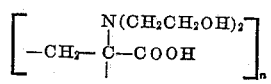

and is very useful for the above purposes.

Other amines that can be used include ammonia, methyl amine, diethylamine, diamyl amine, octyl amine, cyclohexyl- and dicyclohexylamine, di-isopropanolamine, monoethanolamine, diethylene triamine, aminothiazole, and the like. Ammonia and the amines disclosed herein are examples of bases of the ammonia type containing at least one hydrogen atom attached directly to nitrogen. Also, instead of polymers of alpha-chloroacrylic acid, one can use polymers of alpha-bromo, iodo, and fluoroacrylic acids, or their derivatives, such as esters, amides, acyl halides, salts, and the like. In certain instances, it may be desired to use mixtures of one or more amino compounds.

When certain derivatives of the haloacrylic acids are used instead of the acids themselves, reaction with the nitrogenous chemicals often produce polyaminoamides instead of polyaminoacids. For example, when dimethyl amine is condensed with methyl polychloroacrylate, the ultimate product is basic in nature and appears to consist of units such as the following:

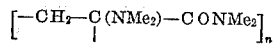

These compounds are also hydrophilic, and if desired, may be converted in part or all to the corresponding polyaminoacid, by subjecting the polymer to hydrolysis, whereupon the amido linkage is split into the free carboxyl and amine groups.

Instead of using a straight polyhaloacrylate, one may use a copolymer of a haloacrylic acid or derivative with one or more of the following: acrylic acid, methylacrylic acid, methyl acrylate, methyl methylacrylate, maleic anhydride, chloromaleic anhydride, ethyl maleate, styrene, vinyl chloride, vinylidene chloride, vinyl acetate, and the like. For example, when a copolymer of alpha-chloroacrylic and acrylic acids is prepared, and this is treated with diethanolamine, the resulting product is acidic in nature, containing an excess of carboxyl over amino groups.

The alphahaloacrylic acid and derivatives thereof disclosed above are considered as alpha-haloacrylic compounds. Polymers of alpha-haloacrylic acid and derivatives thereof can also be described as poly-alpha-haloacrylic compounds.

Instead of using a polymer of a haloacrylic acid, it is also possible to use a polymer of an unhalogenated acrylic acid, containing free hydrogen atoms, and subject this to halogenation conditions, whereupon halogen atoms are introduced directly into the polymeric molecule. On subsequent treatment of this product with an amine, polyaminoacids of high molecular weight can be produced.

The best method for carrying out the reaction appears to comprise heating the halogen-containing polymer with the desired amino compound, generally at temperatures in the range of 75–300° C. until substantially all of the halogen has been removed. This is readily detected by conventional analysis for halide ion. The exact conditions selected will vary depending upon the halogen and the amino compound. Thus, bromo and iodo atoms are more readily removed than chlorine or fluorine atoms. In general, it is best to employ a large excess of the amino compound, to increase the rate of reaction and insure substantially complete removal of the halogen. Also, where amino compounds containing more than one hydrogen on the nitrogen are employed, such as ammonia, monomethyl amine, and the like, there is a tendency for lactam formation and intermolecular linking. Intermolecular linking leads to reduction in solubility of the product, but can be controlled by using a large excess of amino compound, thus keeping the concentration of polymer low and the opportunity for cross-linking at a minimum.

Where the halogen-containing polymer is heated with the nitrogen compound in aqueous solution or in the presence of water, there is a tendency for the introduction of hydroxyl groups and consequent lactone formation. Here, too, cross-linking can be minimized by operating with dilute solutions.

Cross-linked lactones or lactams, when formed, can generally be made more soluble by treatment with stronger alkalies, such as sodium and potassium hydroxides in dilute solution or suspension, followed by adjustment of the pH to the desired point also in dilute solution.

The products of this invention may be used wherever high polymeric compounds of hydrophilic properties are of advantage.

These products may be used in a variety of industrial applications. Some of these include the stabilization of natural rubber latex, the stabilization of synthetic rubber and plastic latices formed by direct polymerization, the stabilization of emulsions and dispersions, including ice cream, shortening, margarine, dressings, and the like. They may be used as thickening agents and dyeing assistants in the textile industry, as sizes for textiles, paper, and leather, in cosmetics, dental impression compounds, adhesives, water emulsion paints, boiler compounds, cleaning compounds and detergents, and oil well drilling muds.

The products of this invention lend themselves, in certain instances, to the formation of insoluble products which can be used in protective coatings, membranes, and the like. For example, when polymers rich in carboxyl groups are treated with aluminum chloride and the like, insoluble complexes are formed. Also, with polymeric aminoacids or derivatives containing residual hydroxyl or amino groups with hydrogen atoms on the nitrogen atom, films may be deposited and then heated, whereupon cross-linking apparently occurs to form insoluble products.

The invention will be further illustrated by the following specific examples of the practice of it.

Example 1

One mole of methyl acrylate is mixed with 5% of methyl alcohol, and stirred while chilling in an ice bath. It is then chlorinated while continuing the stirring and cooling, the reaction discontinued after one mole of chlorine has been introduced. The product is distilled under reduced pressure, and the fraction coming over at about 70–75° C. (20 mm. of Hg) is collected. This is methyl alpha, beta-dichloropropionate.

The methyl dichloropropionate is dehydrohalogenated by stirring with excess barium hydroxide and water at room temperature. This is then acidified with aqueous sulfuric acid and extracted with ether. The ether extract is dried over anhydrous magnesium sulfate and the ether evaporated under reduced pressure at room temperature. The residue is recrystallized from low-boiling petroleum ether, to give crystalline alpha-chloroacrylic acid, M. P. 64–5° C.

The chloroacrylic acid is polymerized by heating with a trace of benzoyl peroxide to 70° C., whereupon the solid homopolymer of chloroacrylic acid is produced. This is powdered and washed with anhydrous ether to remove any unreacted monomeric acid, then dried in vacuo.

Ten parts of powdered polychloroacrylic acid was placed in a stainless steel pressure vessel and chilled in a solid carbon dioxide bath. To this was added 500 parts of dimethyl amine, the vessel closed, and the whole then heated to 200° C. for one hour. The amine was then boiled off, and the soiled residue washed with hot alcohol to remove dimethylammonium chloride. After vacuum drying, a whitish solid remained which dissolved readily in water to give solutions of increased viscosity. Titration of these solutions with both acid and alkali showed that the polymer had the capacity for binding both. The titration analyses showed that the integral acidic and basic groups were present in approximately equimolar proportions, and demonstrated that the product was a high polymer containing amino and carboxyl groups.

Example 2

Methyl dichloropropionate, as prepared in Example 1, was converted to methyl alpha-chloroacrylate by heating 20 parts of the dichloroester with 30 parts of sodium carbonate and 3 parts of sodium bicarbonate until no more distillate could be collected. The distillate was redistilled under a pressure of 50–60 mm. of mercury, collecting methyl alpha-chloroacrylate at 55–60° C.

Methyl chloroacrylate was polymerized by heating at 70° C. with a trace of benzoyl peroxide, whereupon a clear glassy solid was produced. This was dissolved in chloroform and precipitated with alcohol as a powder. The powder was dried in vacuo, and then heated in a pressure vessel with a large excess of dimethyl amine to 250° C. After the reaction, the excess amine was boiled off, leaving a whitish solid. This was washed carefully with alcohol and dried, to give a powderable whitish solid which dissolved readily in water to give viscous solutions. This white solid was alkaline in nature and might be considered to have the formula

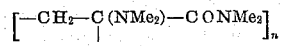

On boiling an aqueous solution, dimethyl amine was liberated, and the basicity decreased, some of the amide groups being converted to carboxyl groups.

Example 3

The procedure of Example 1 is followed using, instead of methyl dichloropropionate, ethyl dibromopropionate. This was dehydrohalogenated by the given procedure to alpha-bromoacrylic acid. This was polymerized to the solid polybromoacrylic acid, which was then boiled with a large excess of aqueous concentrated ammonium hydroxide. Tests showed the rapid appearance of bromide ions, and when the theoretical amount had appeared, the contents were separated by dialysis, whereafter the polymer remaining was dried, and was found to be a hydrophilic solid containing amino, carboxyl, and hydroxyl groups as well as some lactam units.

When a film of this polymer was heated at 200° C. for four hours, it became insoluble in water and the usual solvents, although remaining clear and coherent.

Example 4

The polymer of methyl alpha-chloroacrylate was mixed with excess diethanolamine and heated to 250° C. The polymer dissolved rapidly and a clear solution was formed, containing a new polymer, whose structure might be represented as follows:

$$\left[ -CH_2-\underset{\underset{N(CH_2CH_2OH)_2}{|}}{C}-CON(CH_2CH_2OH)_2 \right]_n$$

This product was separated by dialysis in aqueous solution, followed by evaporation to dryness, leaving a hygroscopic solid. It proved to be extremely effective as an emulsion and latex stabilizer, and was particularly useful in polymerization recipes for the production of synthetic rubber latices.

*Example 5*

The procedure of Example 1 was followed, except that one of the following nitrogenous chemicals is substituted, mole for mole, for the dimethyl amine used in the example. The nitrogenous chemicals so substituted are ammonia, methyl amine, diethyl amine, diamyl amine, octyl amine, monoethanolamine, diisopropanolamine, cyclohexylamine, diethylene triamine, aminothiazole, ethyl aminoacetate. The products obtained are all high-molecular weight polymers, soluble in water and amphoteric in nature.

*Example 6*

One mole of monomeric alpha-chloroacrylic acid and one mole of monomeric acrylic acid were mixed and then polymerized with benzoyl peroxide as catalyst as in Example 1. The resulting product was a copolymer of the two acids, and when this was heated with dimethyl amine as described, the final solid polymer obtained contained roughly twice as many carboxyl groups as amino groups.

*Example 7*

A product was prepared by copolymerizing equimolar amounts of chloroacrylic acid and methyl chloroacrylate. When this copolymer was heated with dimethyl amine and purified, the resulting high polymer was basic in nature, containing substantially two amino groups for every carboxyl group and every amide group.

*Example 8*

The procedure of Example 6 was followed, wherein a copolymer was produced, except that one of the following monomers was substituted, mole for mole, for the acrylic acid. The monomers so substituted were styrene, vinyl chloride, vinyl acetate, methyl methacrylate, ethyl acrylate, maleic anhydride, ethyl maleate, methyl fumarate, and vinylidene chloride. In each case, high-molecular weight aminoacids, of hydrophilic properties were produced.

*Example 9*

The procedure of Example 1 was followed except that the polymer of chloroacrylic acid was replaced by the product obtained by chlorinating polyacrylic acid to a combined chlorine content of 33% by weight. When this chlorinated polyacrylic acid was heated with dimethyl amine, dimethylammonium chloride appeared, and a high molecular weight polyamino acid was produced.

It will be understood that it is intended to cover all changes and modifications of the examples of the invention herein chosen for the purpose of illustration which do not constitute departures from the spirit and scope of the invention.

What I claim is:

1. As a new compound, the hydrophilic amino derivative of the homopolymer of acrylic acid, the said derivative being of the formula $$\left[ -CH_2-\underset{\underset{COOH}{|}}{\overset{\overset{NR'R''}{|}}{C}} \right]_n$$

in which R' and R'' each represents a component selected from the group consisting of hydrogen, alkyls, hydroxyalkyls and cycloalkyls and $n$ indicates the number of moles of monomer associated in the polymer.

2. The derivative of claim 1 in which R' and R'' represent hydrogen.

3. The derivative of claim 1 in which R' and R'' represent methyl groups.

4. The derivative of claim 1 in which R' and R'' represent hydroxyethyl groups.

5. The method of producing a water soluble amino derivative of the homopolymer of poly alpha-chloroacrylic acid which comprises forming a mixture of the said homopolymer with an excess above stoichiometric proportion of a compound selected from the group consisting of ammonia and primary and secondary amines containing only 1 nitrogen atom and maintaining contact of the materials in the mixture until substantially all the chlorine has been replaced from the said acid.

6. The process of claim 5 which includes separating the resulting poly alpha-monoamino-acrylic acid from by-product chloride formed in the reaction.

References Cited in the file of this patent

UNITED STATES PATENTS

| | | |
|---|---|---|
| 2,304,637 | Hardy | Dec. 8, 1942 |
| 2,508,717 | Jones | May 23, 1950 |
| 2,533,166 | Jones | Dec. 5, 1950 |
| 2,548,091 | Barnes et al. | Apr. 10, 1951 |
| 2,582,194 | Dudley | Jan. 8, 1952 |
| 2,622,074 | Coover et al. | Dec. 16, 1952 |
| 2,626,944 | Coover et al. | Jan. 27, 1953 |
| 2,671,072 | Ham et al. | Mar. 2, 1954 |

OTHER REFERENCES

Marvel et al., Journ. Amer. Chem. Soc., vol. 62, December 1940, pages 3495, 3496 and 3498.